US010108515B2

(12) United States Patent
McCoy et al.

(10) Patent No.: US 10,108,515 B2
(45) Date of Patent: Oct. 23, 2018

(54) REMOTELY TESTING ELECTRONIC DEVICES USING MESSAGING AND PRESENCE PROTOCOL

(71) Applicants: SONY CORPORATION, Tokyo (JP); SONY NETWORK ENTERTAINMENT INTERNATIONAl LLC, Los Angeles, CA (US)

(72) Inventors: Charles McCoy, Coronado, CA (US); Aran Sadja, San Diego, CA (US); Ling Jun Wong, Champaign, IL (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 402 days.

(21) Appl. No.: 13/783,116

(22) Filed: Mar. 1, 2013

(65) Prior Publication Data
US 2014/0250331 A1    Sep. 4, 2014

(51) Int. Cl.
G06F 11/00     (2006.01)
G06F 11/26     (2006.01)
G06F 11/22     (2006.01)

(52) U.S. Cl.
CPC ........ G06F 11/261 (2013.01); G06F 11/2294 (2013.01)

(58) Field of Classification Search
CPC . H04N 17/00; G06F 11/2294; G06F 11/0748; H04L 43/50
See application file for complete search history.

(56) References Cited

U.S. PATENT DOCUMENTS

| | | | | |
|---|---|---|---|---|
| 5,600,789 A | * | 2/1997 | Parker | G06F 11/3688 714/38.11 |
| 5,953,519 A | * | 9/1999 | Fura | G06F 17/5022 716/103 |
| 7,421,371 B2 | * | 9/2008 | Segers | G06F 11/0733 702/183 |
| 7,716,473 B1 | * | 5/2010 | Kraemer | G06F 21/6218 703/6 |
| 7,734,909 B1 | | 6/2010 | Roush et al. | |

(Continued)

FOREIGN PATENT DOCUMENTS

| CN | 1215535 A | 4/1999 |
|---|---|---|
| CN | 1969266 A | 5/2007 |

(Continued)

OTHER PUBLICATIONS

Chinese Office Action issued in co-pending application No. 2014800095620 dated Dec. 21, 2016

*Primary Examiner* — Loan L. T. Truong
(74) *Attorney, Agent, or Firm* — Procopio, Cory, Hargreaves & Savitch LLP (57) ABSTRACT

Remotely testing a client device, the method including: implementing an interface of a messaging and presence protocol; starting a connection of the messaging and presence protocol between the client device and a server; initiating a test to execute steps of the test over the messaging and presence protocol connection; indicating information regarding results of the test to send over the messaging and presence protocol connection. Key words include remote testing and XMPP.

22 Claims, 4 Drawing Sheets

(56) References Cited

U.S. PATENT DOCUMENTS

| | | | |
|---|---|---|---|
| 8,151,247 B2* | 4/2012 | Wefers | 717/124 |
| 8,302,050 B1* | 10/2012 | Hollander | G01R 31/31705 716/106 |
| 8,739,259 B1* | 5/2014 | Kumar et al. | 726/7 |
| 9,020,621 B1* | 4/2015 | Proctor | H04R 5/04 700/94 |
| 9,538,404 B2 | 1/2017 | Seckendorf | H04W 24/06 |
| 9,558,307 B1* | 1/2017 | Yanai | G06F 17/5045 |
| 9,798,640 B2* | 10/2017 | Rucker | G06F 11/2294 |
| 2002/0083213 A1* | 6/2002 | Oberstein et al. | 709/313 |
| 2004/0014014 A1* | 1/2004 | Hess | G09B 23/28 434/236 |
| 2004/0133409 A1* | 7/2004 | Mukherjee | G01R 31/31704 703/14 |
| 2004/0260993 A1* | 12/2004 | Griffin | G06F 11/3414 714/743 |
| 2005/0118557 A1* | 6/2005 | Sumner, II | G09B 7/02 434/118 |
| 2005/0226162 A1* | 10/2005 | Shrum et al. | 370/241 |
| 2006/0122818 A1* | 6/2006 | Behm | G06F 17/5022 703/17 |
| 2007/0168727 A1* | 7/2007 | Fournier | G01R 31/31835 714/25 |
| 2007/0239702 A1* | 10/2007 | Vassilvitskii | G06F 17/30864 |
| 2008/0120521 A1* | 5/2008 | Poisson et al. | 714/26 |
| 2008/0137593 A1* | 6/2008 | Laudermilch | H04W 48/02 370/328 |
| 2008/0165789 A1* | 7/2008 | Ansari | G06Q 30/04 370/401 |
| 2008/0184075 A1* | 7/2008 | Merriman | G06F 11/3688 714/38.1 |
| 2009/0037557 A1* | 2/2009 | Seger | G06F 11/30 709/217 |
| 2009/0279673 A1* | 11/2009 | Maffre et al. | 379/1.03 |
| 2009/0292696 A1* | 11/2009 | Shuster | G06F 17/30867 |
| 2010/0064763 A1* | 3/2010 | Gaikwad | H04L 41/0253 73/1.01 |
| 2010/0099060 A1* | 4/2010 | Bijou | G09B 7/00 434/107 |
| 2010/0227607 A1* | 9/2010 | Lorion | H04B 17/0085 455/425 |
| 2010/0241748 A1 | 9/2010 | Ansari et al. | |
| 2011/0134763 A1* | 6/2011 | Medina | H04N 21/2368 370/252 |
| 2011/0138458 A1 | 6/2011 | Kumar et al. | |
| 2012/0035904 A1* | 2/2012 | Seckendorf | B21D 5/00 703/21 |
| 2012/0102097 A1* | 4/2012 | Jobe et al. | 709/203 |
| 2012/0113269 A1* | 5/2012 | Birch | H04N 5/44 348/192 |
| 2012/0151549 A1* | 6/2012 | Kumar | H04N 17/004 725/131 |
| 2012/0155496 A1* | 6/2012 | Yasuie | H04L 43/50 370/503 |
| 2012/0167162 A1* | 6/2012 | Raleigh | G06F 21/57 726/1 |
| 2012/0246676 A1* | 9/2012 | Shaphy et al. | 725/34 |
| 2012/0255023 A1* | 10/2012 | Maor | G06F 21/56 726/25 |
| 2012/0260344 A1* | 10/2012 | Maor | G06F 11/3688 726/25 |
| 2012/0303798 A1* | 11/2012 | Crowell et al. | 709/224 |
| 2013/0007711 A1* | 1/2013 | Fryc et al. | 717/124 |
| 2013/0063606 A1* | 3/2013 | McClay | H04N 17/004 348/181 |
| 2013/0110637 A1* | 5/2013 | Bott | H04W 4/003 705/14.64 |
| 2013/0124735 A1* | 5/2013 | Shin et al. | 709/226 |
| 2013/0227030 A1* | 8/2013 | Eidelson et al. | 709/206 |
| 2013/0232374 A1* | 9/2013 | McCoy et al. | 714/4.1 |
| 2013/0347050 A1* | 12/2013 | Friel | H04N 17/00 725/133 |
| 2014/0040667 A1* | 2/2014 | Zemer | G06F 11/3684 714/32 |
| 2014/0137228 A1* | 5/2014 | Shema et al. | 726/11 |
| 2014/0188798 A1* | 7/2014 | Mackenzie | G06F 17/30581 707/625 |
| 2014/0223418 A1* | 8/2014 | Michelsen et al. | 717/135 |
| 2014/0258744 A1* | 9/2014 | Meyer | G06F 1/3203 713/320 |
| 2015/0208134 A1* | 7/2015 | Cao | H04H 20/82 725/53 |
| 2016/0072692 A1* | 3/2016 | Patwardhan | H04L 43/14 709/224 |
| 2017/0235786 A9* | 8/2017 | Faith | G06F 17/30377 707/607 |
| 2017/0359335 A1* | 12/2017 | Johnson | G06F 21/72 |
| 2018/0042067 A1* | 2/2018 | Nirantar | H04W 52/0258 |

FOREIGN PATENT DOCUMENTS

| | | |
|---|---|---|
| CN | 101981900 A | 2/2011 |
| CN | 102006205 A | 4/2011 |
| CN | 102594845 A | 7/2012 |
| WO | 2008085204 A2 | 7/2008 |

* cited by examiner

REMOTELY TESTING ELECTRONIC DEVICES USING MESSAGING AND PRESENCE PROTOCOL

BACKGROUND

Field of the Invention

The present invention relates to remote testing, and more specifically, to remotely testing electronic devices using messaging and presence protocol.

Background

A remote computer can be accessed and controlled using remote access services via a computer network. For example, a remote access server process executing on the remote computer may establish an operating system instance having a desktop display and one or more executing applications. This operating system may then be instantiated locally by executing a remote access client to interface with the instance using a graphical user interface. Recently, other electronic devices, such as television sets, have been increasing in complexity and access to the internal parts of the electronic devices is needed to diagnose and fix the electronic devices.

SUMMARY

The present invention provides for remotely testing or diagnosing a client device.

In one implementation, a method of remotely testing a client device is disclosed. The method includes: implementing an interface of a messaging and presence protocol; starting a connection of the messaging and presence protocol between the client device and a server; initiating a test to execute steps of the test over the messaging and presence protocol connection; indicating information regarding results of the test to send over the messaging and presence protocol connection.

In another implementation, a remote testing system is disclosed. The system includes: an interface unit configured to communicate with a client device, wherein the client device is enabled to establish a connection with a test server using a messaging and presence protocol; a test/diagnostics unit configured to run a test using the messaging and presence protocol connection; and a processor configured to indicate information regarding results of the test to send over the messaging and presence protocol connection.

In yet another implementation, a non-transitory storage medium storing a computer program to remotely test a client device is disclosed. The computer program includes executable instructions that cause a computer to: implement an interface of a messaging and presence protocol; initiate a connection of the messaging and presence protocol between the client device and a server; initiate a test to execute steps of the test over the messaging and presence protocol connection; indicate information regarding results of the test to send over the messaging and presence protocol connection.

Other features and advantages of the present invention will become more readily apparent to those of ordinary skill in the art after reviewing the following detailed description and accompanying drawings.

DETAILED DESCRIPTION

Certain implementations as disclosed herein provide for remotely servicing and testing an electronic device by enabling a customer service agent to query and control features and settings of the device using a messaging and presence protocol. In one implementation, the electronic device includes consumer electronic appliances such as an audio system, video player, disc player, or television set. In another implementation, the electronic device includes an Internet-related device such as a modem, router, or gateway. In the specification, the term "electronic device" is used interchangeably with "client device". After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In many cases, testing electronic devices can be very time consuming and prone to human error. Traditional automated testing relies on special code to run on the client device and is usually quite limited in the scope of what it can test. It may be good for unit testing of small pieces of the client code, but less useful for testing the overall functionality of a device. For example, there are frameworks for automated testing which relies on special test code to be written and run on the client device. This code is usually limited in its scope as it is difficult to simulate user interaction with the system.

In one implementation of the present invention, the electronic device implements a messaging and presence protocol interface to a server (e.g., a testing server) that allows features and settings of the device to be queried and set. The messaging and presence protocol can include an Extensible Messaging and Presence Protocol (XMPP), Internet Relay Chat (IRC) protocol, raw socket connections, or other proprietary protocols. The interface also allows the server to simulate user interaction with the device. A connection to the testing server is made by attaching the device to a special testing box (or network) and initiating an XMPP session. An automated test can then be initiated to execute the steps of the test over the XMPP connection and run through a series of tests after each action. The server indicates what log statements should be sent over the XMPP connection and monitors the log statements to ensure the conformance of the statements to specifications of the test case. Thus, the XMPP interface allows a user (e.g., tester or developer) to initiate a test case on an electronic device and have the test server run the device through steps of the test case. The interface can also be used to correct certain problems that are found with the device. For example, if a testing reveals that the balance control is set completely to the left speaker, then that would cause no sound out of the right speaker. That problem could be fixed through the interface by setting the balance control back to have sound come out of both speakers. In other implementations, the interface may be used by a technician to access the internal state of the device and interactively monitor the device configuration and other values, set the device configuration and other values, execute commands on the device, and/or run tests and monitor the results.

This process is equivalent to a user interacting with the device through remote control button presses, physical button presses, touch screen touches, or other input appropriate for the device. This allows the user (e.g., tester or developer) to get very accurate and repeatable results. The XMPP interface also allows the internal state of the device (e.g., the number of items in a list loaded from a network) which would not be observable through the device's user interface to be queried. Further, the automation of these tests makes it much quicker, more consistent, and more convenient to run a complete set of tests on an electronic device, which reduces the amount of time spent testing while increasing the amount of testing that is done.

Accordingly, in one implementation, an external testing server can execute tests on a device that does not have any testing code on the device itself by having the client device initiate an XMPP session to the external testing server and having an application programming interface (API) that allows that server to query and control the client device. Moreover, the API allows the server to easily mimic user interactions with the device to test the system at a high level, which is difficult to do with traditional automated testing technologies.

In alternative implementation, the XMPP session can be used to enable a customer service console that will allow a customer service representative to observe the device's state and control the device. The XMPP session will also allow other remote control and monitoring applications to be developed. There could be a set of automated tests that are run on each unit as it rolls off of the assembly line through the XMPP session to a test server described above.

Figure 1A:
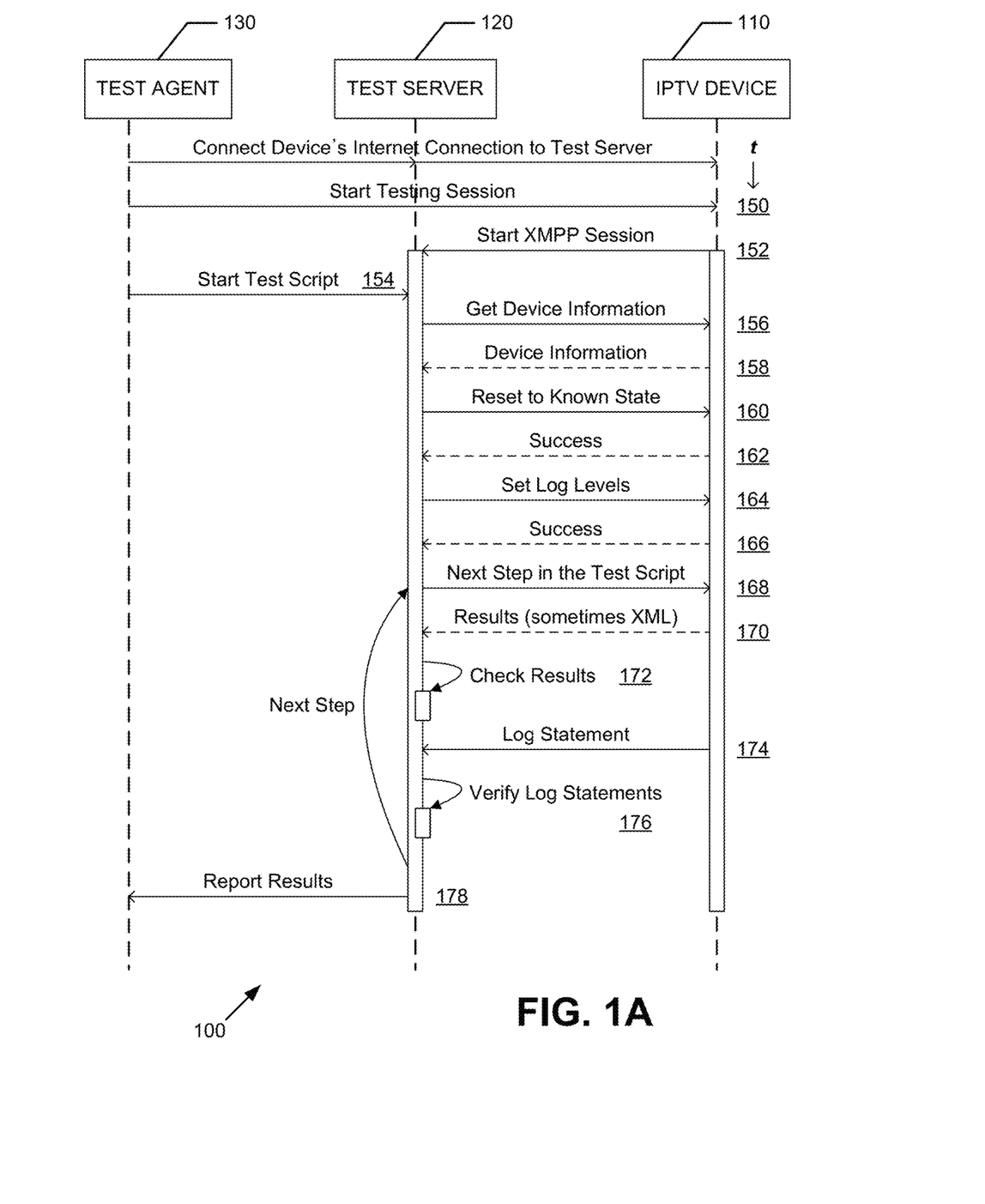
FIG. 1A is a timeline sequence diagram illustrating an automated method of remotely testing electronic devices using messaging and presence protocol in accordance with one implementation of the present invention.

FIG. 1A is a timeline sequence diagram 100 illustrating an automated method of remotely testing electronic devices using messaging and presence protocol in accordance with one implementation of the present invention. In the illustrated implementation of FIG. 1A, the client device 110 is represented as an Internet Protocol Television (IPTV) device which is network connected to a test server 120 and a test agent 130. The test agent 130 starts a testing session, at t=150, with the client device 110.

In this implementation, the client device 110 starts an XMPP session, at t=152, to the testing server 120 that allows features and settings of the device to be queried and set. The test agent 130 then sends 'start test script' command, at t=154, and triggers the test server 120 to send 'get device information' command, at t=156, to the client device 110. In response, the client device 110 sends the device information to the test server 120, at t=158. The test server 120 then resets the client device 110 to a known state, at t=160, and sets log levels, at t=164. The client device 110 acknowledges by sending back 'success' signals, at t=162&166, when the settings are done. The test server 120 performs next steps in the test script, at t=168, and checks for results, at t=172, and verifies log statements, at t=176, when the client device 110 sends back the results, at t=170, and the log statements, at t=174. It should be noted that step t=168 may execute a command on a box, set a value or state on the box, or query a value or state on the box. The test server 120 then reports the results back to the test agent 130, at t=178.

In an alternative implementation to the illustrated implementation of FIG. 1A, a testing technician manually initiates each action shown in FIG. 1A and evaluates the results. This alternative implementation is useful in the case where the behavior of the device cannot be diagnosed with the existing set of automated tests, for example, when a new bug appears that no automated test cases have been created to diagnose.

In another implementation to the illustrated implementation of FIG. 1A, the user interacts with the client device to start a "diagnostic session" where the device will connect to a server that uses the connection to run a series of diagnostic tests. These tests can be run automatically. The connection can be used to have the device display the results of the tests to the user so that the user can view any problems that the testing may have revealed.

In yet another implementation, a technician uses a box that provides a network connection to the client device such that when the client device starts a session, the connection is made with the box. The technician can then use the box to run tests, view results, and make changes to the state of the client device to fix problems.

In yet another implementation, the automated test is followed by corrective step(s) made to the state of the client device to fix any problem(s) that were found in the test. This corrective step could be automated or could require human approval and or initiation.

Figure 1B:
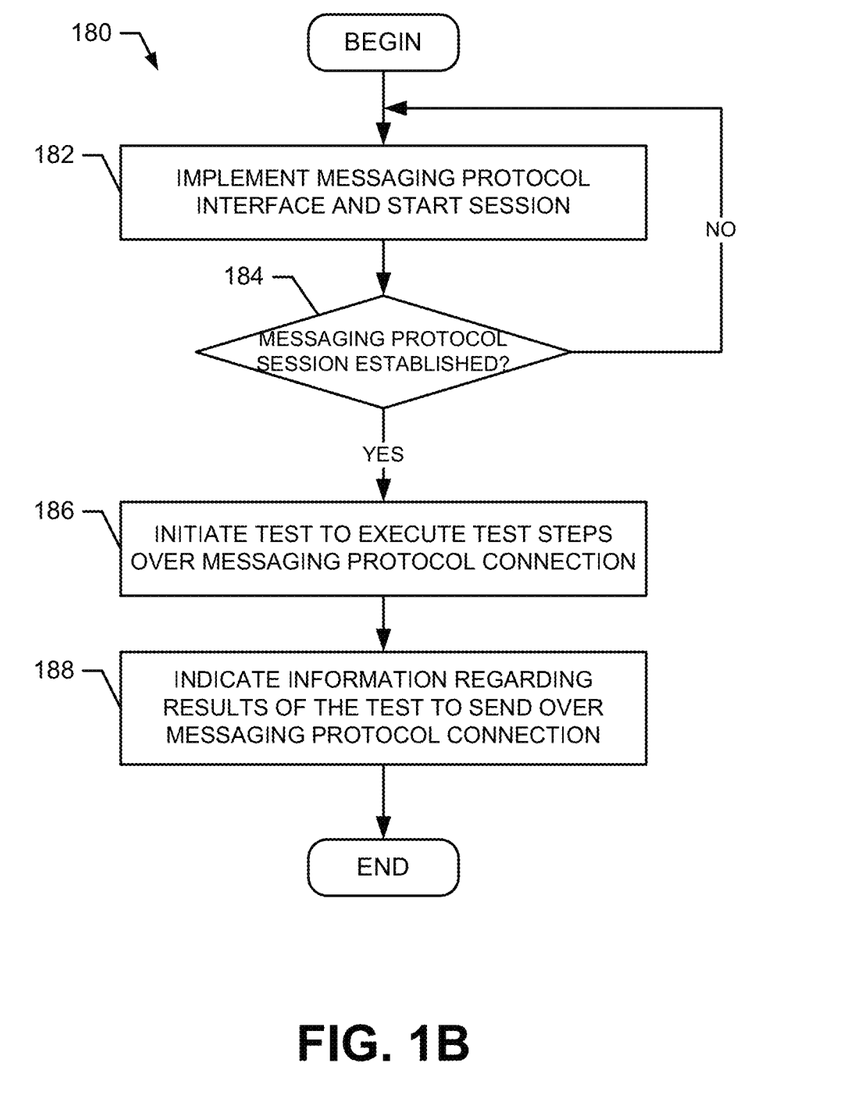
FIG. 1B is a flowchart illustrating an automated method of remotely testing electronic devices using messaging and presence protocol in accordance with one implementation of the present invention.

FIG. 1B is a flowchart 180 illustrating an automated method of remotely testing electronic devices using messaging and presence protocol in accordance with one implementation of the present invention. In the illustrated implementation of FIG. 1B, the electronic device implements a messaging and presence protocol interface (e.g., the XMPP interface) and starts a messaging and presence protocol session (e.g., the XMPP session) to the test server, at box 182, that allows features and settings of the device to be queried and set. The interface also allows the test server to simulate user interaction with the device. In one implementation, a connection to the testing server is made by attaching the device to a special testing box (or network) and initiating an XMPP session. A query is made, at box 184, to determine whether the XMPP session has been established. Once the session has been established, at box 184, a test is then be initiated, at box 186, to execute the steps of the test over the XMPP connection and run through a series of tests after each action. The server indicates what information regarding results of the test should be sent over the XMPP connection, at box 188. In one implementation, the information regarding results of the test is included in log statements. Thus, once the log statements are indicated by the server, the server monitors the log statements to ensure the conformance of the statements to specifications of the test case. Thus, the XMPP interface allows a user (e.g., tester or developer) to initiate a test case on an electronic device and have the test server run the device through steps of the test case.

This process is equivalent to a user interacting with the device through remote control button presses, physical button presses, touch screen touches, or other input appropriate for the device. This allows the user (e.g., tester or developer) to get very accurate and repeatable results. The XMPP interface also allows the internal state of the device (e.g., the number of items in a list loaded from a network) which would not be observable through the device's user interface to be queried. Further, the automation of these tests makes it much quicker, more consistent, and more convenient to run a complete set of tests on an electronic device, which reduces the amount of time spent testing while increasing the amount of testing that is done.

Figure 2:
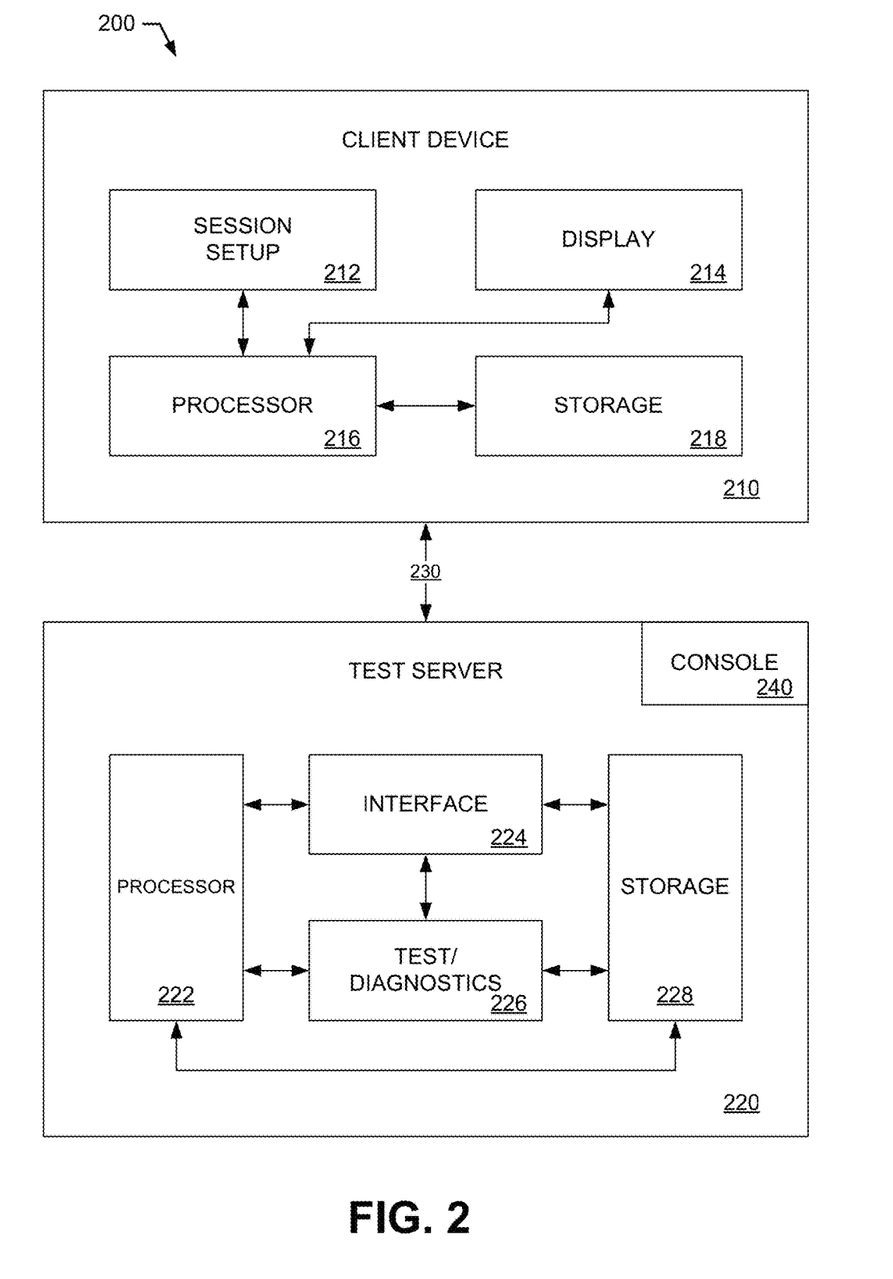
FIG. 2 is a functional block diagram of a remote device testing system in accordance with one implementation of the present invention.

FIG. 2 is a functional block diagram of a remote device testing system 200 in accordance with one implementation of the present invention. In the remote device testing system 200, a test server 220 is configured to remotely service and test a client device 210 by enabling a customer service agent to query and control features and settings of the device 210 using a messaging and presence protocol. In the illustrated implementation of FIG. 2, the server 220, which is in communication with the client device 210, also includes a processor 222, an interface 224, a test/diagnostics unit 226, and storage 228. The client device 210 includes a session setup unit 212, a display 214, a processor 216, and storage 218. In one example, the client device 210 can be configured as an Internet Protocol Television (IPTV) unit.

In one implementation, the session setup unit 212 of the client device 210 implements a messaging and presence protocol connection and starts a messaging and presence protocol session 230 to the test server 220 that allows features and settings of the device to be queried and set. The session 230 also allows the test server 220 to simulate user interaction with the device 210. In one implementation, a connection to the test server 220 is made by attaching the device 210 to a special testing box (or network) and initiating an XMPP session.

The test/diagnostics unit 226 queries and controls the client device 210 through a messaging and presence protocol. The interface unit 224 of the test server 220 communicates with the session setup unit 212 using the messaging and presence protocol. In one implementation, the test/diagnostics unit 226 can communicate messages using the XMPP to exchange messages information in near-real-time.

Once the session is established, the processor 222 of the server 220 would then be able to initiate an automated test to execute the steps of the test over the XMPP connection and run through a series of tests after each action. Statistics and settings of the client device 210 can be stored in the storage 228. The processor 222 could also use the session established by the interface unit 224 and the session setup unit 212 to control and update the client device 210.

The messaging and presence protocol session (e.g. an XMPP session) 230 between the server 220 and the client device 210 enables a customer service agent to work directly with the client device 210 rather than interact with the user of the client device who would interact with the client device and describe the results to the agent. This would allow the customer service agent to run tests on the client device 210 in much less time. It should be noted that the XMPP session 230 between the server 220 and the client device 210 can be a direct connection or routed through local networks and/or the Internet.

In another implementation, the session setup unit 212 selects an item on a menu which would establish a connection with a customer service agent (not shown) using a messaging and presence protocol. In one implementation, the customer service agent is co-located with the server 220. In another implementation, the customer service agent is remotely located from the server 220. The customer service agent would then respond with a session ID that would be displayed to the user on the display 214. The agent uses that session ID relayed to the agent by the user to attach to the client device's session and run tests to detect and fix any problem with the client device 210. For example, a console 240 of the customer service agent can query features and settings from the client device 210 and display them on the console 240 for the agent to read the features and settings, without having to ask the user to find and read settings from the client device 210. The console 240 can even query and display information about the client device 210 that is not accessible through the user interface of the client device 210, and would therefore not have previously been available by asking the user to interact with the client device and describe the state of the device. This information could describe the inner workings of the client device 210 and provide information that would be very helpful to the customer service agent in determining the cause of the problem. The customer service agent can then control the device 210 through the console 240 and observe the behavior of the client device 210 and how the settings change. The customer service agent can also directly change settings on the client device 210 through the console 240. The console 240 could also perform some automated diagnostics through the querying of the client device 210 that is available to it. This would allow the console 240 to suggest probable causes of the problem along with recommended solutions for that problem. The console 240 can then repeat the steps that caused the problem and confirm that the problem no longer exists.

During testing, the processor 222 of the server 220 indicates what log statements should be sent over the XMPP connection, and monitors the log statements to ensure the conformance of the statements to specifications of the test case. Thus, in one implementation, the XMPP session 230 allows a user (e.g., tester or developer) to initiate a test case on the client device 210 and have the test server 220 run the device through steps of the test case.

In one implementation, the client device 210 includes a consumer electronic appliance such as an audio system, video player, disc player, home theater system, game console, or television. In another implementation, the client device includes a computing device such as a laptop computer, desktop computer, tablet computer, or cell phone. In yet another implementation, the client device 210 includes an Internet-related device such as a modem, router, or gateway.

Figure 3A:
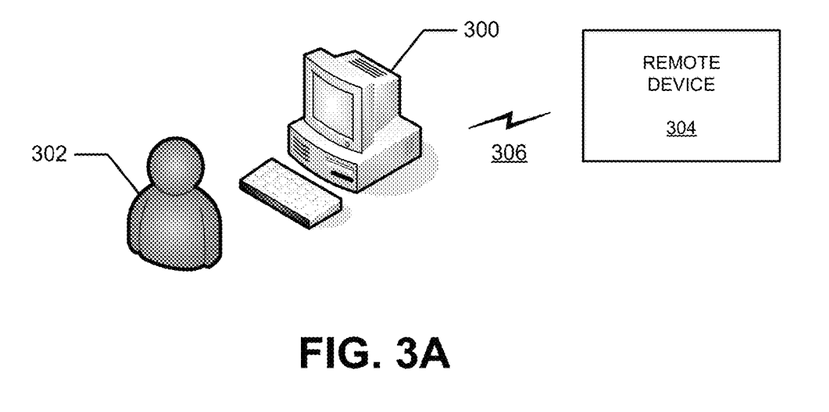
FIG. 3A illustrates a representation of a computer system and an agent.

FIG. 3A illustrates a representation of a computer system 300 and an agent 302. The agent 302 uses the computer system 300 to provide servicing of a remote client device 304. It should be noted that the network connection 306 between the computer system 300 and the remote client device 304 can be a direct connection or routed through local networks and/or the Internet. The computer system 300 stores and executes a remote device testing manager 390. In one implementation, the computer system 300 is configured as a server. In another implementation, the computer system 300 is configured as a console of the customer service agent.

Figure 3B:
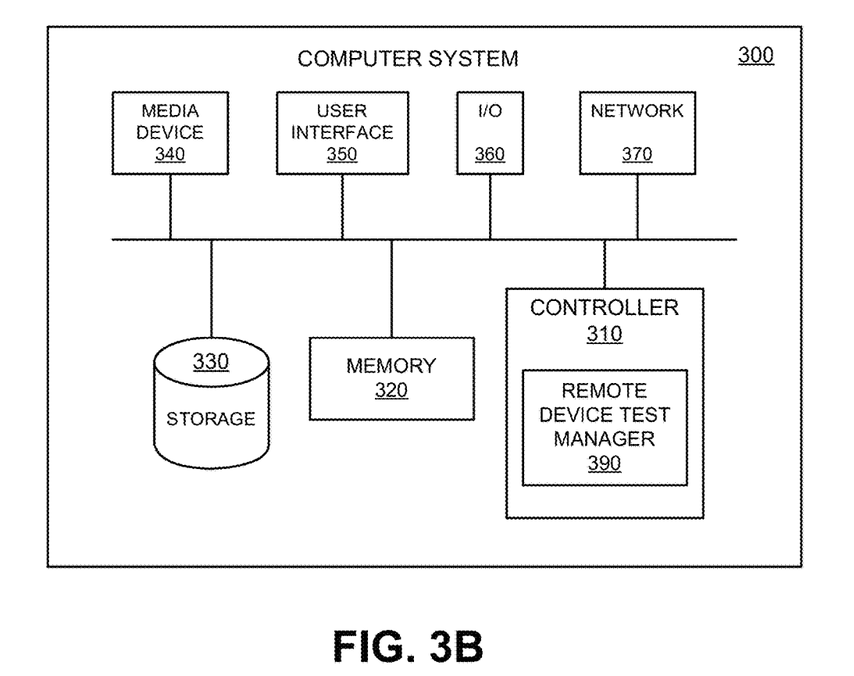
FIG. 3B is a functional block diagram illustrating the computer system hosting the remote device testing manager.

FIG. 3B is a functional block diagram illustrating the computer system 300 hosting the remote device testing manager 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the remote device testing manager 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Non-transitory storage 330 stores data for use by other components of the computer system 300, such as for storing data used by the remote device testing manager 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the agent 302 and presenting information to the agent 302. In one implementation, the user interface 350 includes a keyboard, a mouse, audio speakers, and a display. The controller 310 uses input from the agent 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. For example, throughout the specification, an XMPP is used as an example of a messaging and presence protocol. However, any messaging and presence protocol can be used which may include Internet Relay Chat (IRC) protocol, raw socket connections, or other proprietary protocols. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of remotely testing a client device by a customer service agent at a site of a server remote from the client device, the method comprising:

implementing an interface of a messaging and presence protocol;

starting a connection of the messaging and presence protocol between the client device and the server to enable features and settings of the client device to be queried and set by the server;

initiating a client device test to execute steps of the client device test over the messaging and presence protocol connection including requesting and obtaining device information, resetting the client device to a known state, and setting log levels of the known state of the client device;

simulating a user interaction with the client device using the client device test executed over the messaging and presence protocol connection to enable the customer service agent at the site of the server to directly query the client device; and indicating information regarding results of the client device test to send over the messaging and presence protocol connection.

2. The method of claim 1, further comprising monitoring the information regarding results of the client device test to ensure conformance of the information to specifications of the client device test.

3. The method of claim 1, wherein the connection of the messaging and presence protocol between the client device and the server is made by attaching the client device to a network and initiating a session.

4. The method of claim 1, wherein implementing an interface of a messaging and presence protocol includes enabling a user of the client device to initiate a test case on the client device and have the customer service agent at the site of the server run the client device through steps of the client device test.

5. The method of claim 4, wherein the test case simulates interaction of the user with the client device through at least one of: remote control button presses; physical button presses; touch screen touches; and other input appropriate for the client device.

6. The method of claim 1, wherein the interface of the messaging and presence protocol is an Extensible Messaging and Presence Protocol (XMPP) interface.

7. The method of claim 1, wherein the messaging and presence protocol allows features and settings of the client device to be queried.

8. The method of claim 1, wherein the messaging and presence protocol allows features and settings of the client device to be set.

9. The method of claim 1, wherein the messaging and presence protocol interface enables internal states of the client device to be queried.

10. A remote device testing system, comprising:

an interface unit configured to communicate with a client device, wherein the client device is enabled to establish a connection with a test server using a messaging and presence protocol, wherein the connection enables features and settings of the client device to be queried and set by the test server that is remote from the client device;

a diagnostics unit configured to run a client device test using the messaging and presence protocol connection, the diagnostic unit configured to run the client device test to simulate a user interaction with the client device and to enable a customer service agent at a site of the server to directly query the client device, wherein the client device test includes steps of requesting and obtaining device information, resetting the client device to a known state, and setting log levels of the known state of the client device; and a processor configured to indicate information regarding results of the client device test to send over the messaging and presence protocol connection.

11. The system of claim 10, wherein the information regarding the results of the client device test includes log statements based on the log levels.

12. The system of claim 10, further comprising
a testing box configured to couple to the client device to enable the client device to initiate the messaging and presence protocol connection.

13. The system of claim 10, wherein the messaging and presence protocol connection between the client device and the test server is routed through a local network.

14. The system of claim 10, wherein the client device comprises a consumer electronic appliance including one of an audio system, video player, disc player, home theater system, game console, and television.

15. A non-transitory storage medium storing a computer program to remotely test a client device by a customer service agent at a site of a server remote from the client device, the computer program comprising executable instructions that cause a computer to:
 implement an interface of a messaging and presence protocol;
 initiate a connection of the messaging and presence protocol between the client device and the server to enable features end settings of the client device to be queried and set by the server;
 initiate a client device test to execute steps of the client device test over the messaging and presence protocol connection including requesting and obtaining device information, resetting the client device to a known state, and setting log levels of the known state of the client device;
 simulate a user interaction with the client device using the client device test executed over the messaging and presence protocol connection to enable the customer service agent at the site of the server to directly query the client device; and
 indicate information regarding results of the client device test to send over the messaging and presence protocol connection.

16. The non-transitory storage medium of claim 15, wherein the connection of the messaging and presence protocol between the client device and the server is made by attaching the client device to a network and initiating a session.

17. The non-transitory storage medium of claim 15, wherein executable instructions that cause the computer to implement an interface of a messaging and presence protocol includes executable instructions that cause the computer to
 enable a user of the client device to initiate a test case on the client device and have the customer service agent at the site of the server run the client device through steps of the client device test.

18. The non-transitory storage medium of claim 17, wherein the test case simulates interaction of the user with the client device through at least one of: remote control button presses; physical button presses; touch screen touches; and other input appropriate for the client device.

19. The non-transitory storage medium of claim 15, wherein the interface of the messaging and presence protocol is an Extensible Messaging and Presence Protocol (XMPP) interface.

20. The non-transitory storage medium of claim 15, wherein the messaging and presence protocol allows features and settings of the client device to be queried.

21. The non-transitory storage medium of claim 15, wherein the messaging and presence protocol allows features and settings of the client device to be set.

22. The non-transitory storage medium of claim 15, wherein the messaging and presence protocol interface enables internal states of the client device to be queried.

\* \* \* \* \*